(12) United States Patent
Mansfield et al.

(10) Patent No.: US 6,477,382 B1
(45) Date of Patent: Nov. 5, 2002

(54) FLEXIBLE PAGING FOR PACKET DATA

(75) Inventors: Carl Mansfield, Camas; Izzet M. Bilgic, Kenmore, both of WA (US); Benjamin K. Gibbs, Colorado Springs, CO (US); Sherman L. Gavette, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/592,020

(22) Filed: Jun. 12, 2000

(51) Int. Cl.[7] .................................................. H04Q 7/20
(52) U.S. Cl. ....................... 455/458; 455/515; 455/574; 370/311; 370/313; 370/314
(58) Field of Search ................................ 455/458, 463, 455/515, 561, 567, 574, 426; 370/311, 313, 314; 340/7.2, 7.32, 7.33, 7.34

(56) References Cited

U.S. PATENT DOCUMENTS

| | | | | |
|---|---|---|---|---|
| 5,230,084 A | * | 7/1993 | Nguyen ..................... | 340/7.32 |
| 5,396,543 A | | 3/1995 | Beeson, Jr. et al. .......... | 379/59 |
| 5,918,170 A | * | 6/1999 | Oksanen et al. ............ | 455/343 |
| 5,978,117 A | * | 11/1999 | Koonen ..................... | 359/125 |
| 6,104,998 A | * | 8/2000 | Galand et al. .............. | 704/500 |
| 6,167,248 A | * | 12/2000 | Hamalainen et al. ....... | 455/403 |
| 6,246,713 B1 | * | 6/2001 | Mattisson ................... | 375/132 |
| 6,256,486 B1 | * | 7/2001 | Barany et al. .............. | 455/296 |

* cited by examiner

*Primary Examiner*—Edward F. Urban
*Assistant Examiner*—Temica M. Davis
(74) *Attorney, Agent, or Firm*—Blakely, Sokoloff, Taylor & Zafman LLP

(57) ABSTRACT

A system and method including a flexible paging protocol which adjusts the allocation of resources for paging in response to the amount of actual paging traffic, by increasing resources for paging when paging traffic is heavy and decreasing them when paging traffic is light. A base station transmits a paging packet message over a paging broadcast channel containing a set of paging messages and a next page pointer. The next page pointer identifies when the next set of paging packet message will be transmitted. A user station monitoring the paging channel receives the next page pointer, and, if not being paged, goes to sleep until the next paging packet message is due. When paging traffic is light, paging messages are sent infrequently, freeing up base station resources and allowing the user station to remain asleep longer. When paging traffic is heavy, paging messages are sent more frequently, ensuring rapid response to the pages and reducing the probability of a missed call. The protocol is particularly well suited for use in TDMA environments. The next page pointer may be used in conjunction with a system which also employs a next slot pointer for increasing the speed of control traffic transactions. In a wireless packet-oriented communication system, the base station receives data packets over a backhaul connection, transmits a paging message to the mobile end system, divides the data packet into a sequence of message frames, and transmits the message frames to the mobile end system in assigned time slots.

10 Claims, 9 Drawing Sheets

FLEXIBLE PAGING FOR PACKET DATA

BACKGROUND OF THE INVENTION

1. Field of the Invention

The field of the present invention relates to wireless communication and, more particularly, to paging techniques in a wireless communication system.

2. Description of Related Art

A mobile communication system may generally comprise a set of "user stations," typically mobile and the endpoints of a communication path, and a set of "base stations," typically stationary and the intermediaries by which a communication path to a user station may be established or maintained. A group of base stations may be connected to a base station controller, or a cluster controller, which can in turn be connected to a local public telephone network through, for example, a mobile switching center.

It is generally desirable in a mobile communication system to achieve the greatest possible user traffic capacity at a base station, so that fewer base stations need to be deployed in order to serve user demands. A variety of techniques have been developed or proposed by which a base station is able to communicate with multiple user stations. Such techniques generally each include some means for distinguishing transmissions between different cells and/or between different user stations within a cell. For example, a communication system in which transmissions are distinguished according to the transmission frequency may be referred to as a frequency division multiple access (FDMA) communication system. A communication system in which a forward link transmission over one frequency is paired with a reverse link transmission over a different frequency may be referred to as a frequency division duplex (FDD) communication system. A communication system in which transmissions are distinguished according to the relative timing of the transmission (i.e., by use of time slots) may be referred to as a time division multiple access (TDMA) communication system. A communication system in which a forward link transmission during one time slot (or time segment) is paired with a reverse link transmission occurring during a different time slot (or time segment) may be referred to as a time division duplex (TDD) communication system. A communication system in which transmissions are distinguished according to which code is used to encode the transmission may be referred to as a code division multiple access (CDMA) communication system.

In a CDMA communication system, the data to be transmitted is generally encoded in some fashion, in a manner which causes the signal to be "spread" over a broader frequency range and also typically causes the signal power to decrease as the frequency bandwidth is spread. At the receiver, the signal is decoded, which causes it to be "despread" and allows the original data to be recovered. Distinct codes can be used to distinguish transmissions, thereby allowing multiple simultaneous communication, albeit over a broader frequency band and generally at a lower power level than "narrowband" systems. Different users may thereby transmit simultaneously over the same frequency without necessarily interfering with one another.

In addition to the above, various "hybrid" communication systems incorporating aspects of more than one multiple access communication technique have been developed or proposed.

Initial communication between a user station and a base station can be established either when the user station seeks to initiate communication with a base station (for example, attempting to initiate a telephone call), or when the base station attempts to complete a call to the user station (for example, where the user station is paged). In many conventional mobile communication systems, a dedicated control channel is used to assist mobile stations in establishing communication. According to this technique, the mobile station first communicates over the control channel when establishing communication. The base station then assigns to the mobile station a "permanent" communication channel for exchanging bearer traffic messages for the duration of the call. Particular techniques for establishing initial communication between a base station and a user station are described, for example, in U.S. Pat. No. 5,455,822, U.S. Pat. No. 5,737,324, U.S. Pat. No. 5,671,219, U.S. Pat. No. 5,648,955, and U.S. Pat. No. 5,787,076, each of which is assigned to the assignee of the present invention, and each of which is hereby incorporated by reference as if set forth fully herein.

When a base station pages a user station, the base station typically sends a paging message directed to the specific user station (e.g., by including a specific user station identifier, which may be obtained from the user station at initial registration). Often a special broadcast channel is reserved for this paging purpose, sometimes in conjunction with additional broadcast functions. When the user station receives a paging message, it responds according to the particular communication protocol employed by the system, and thereby receives the incoming call. If more than one paging request is received at the base station, the base station may transmit multiple paging messages sequentially over the broadcast channel. The base station may repeat a paging message, or a group of paging messages, until each user station responds or a paging timeout occurs.

It has been found convenient in many mobile communication systems to allow user stations (particularly cellular telephone handsets) to remain in a low-power, dormant state (i.e., a sleep state) while no call is in progress, becoming active periodically (i.e., awakening) only long enough to determine whether it is being paged. In a typical mobile communication system, a handset awakens or otherwise activates at regular, fixed intervals to monitor the broadcast paging channel from the base station. If the handset receives a paging message during the time it is awake or active, it does not return to sleep or dormancy, but instead responds to the paging message according to the system protocol in an attempt to receive the incoming call. On the other hand, if no paging message for the handset is received, the handset returns to a sleep or dormant state.

In most mobile communication systems, paging is only one of a number of broadcast functions carried out by the base station. Where multiple broadcast functions are performed by the base station, the base station broadcast channel may be shared between paging functions other broadcast functions by, for example, time multiplexing paging messages and other messages. A result is that paging messages may only be sent periodically by the base station. However, if the handset wakes up and monitors the broadcast channel at the wrong times (i.e., at times other than when paging messages are being broadcast from the base station), the handset will miss any paging messages directed to it. One solution to this problem is to define a preset time slot or time interval for broadcasting paging information from the base station. Once the handset locks on to the paging channel, it wakes up at regular intervals matched to the transmission repetition rate of the paging channel. The handset thereby has an increased likelihood of receiving a page, since it will monitor the paging channel only at times when paging information is being transmitted. As a benefit of such an approach, the time which a handset can spend asleep or dormant is increased (thus saving power and increasing battery life), because there is a general assurance that the handset will not miss a page when the handset is asleep or dormant, particularly if the page is repeated a reasonable number of times.

While the above solution may increase power savings at the handset, it is not a totally adequate solution. It suffers from the drawback that the same amount of base station resources are consumed with paging traffic no matter whether the paging traffic is heavy or light. Reserving resources for paging traffic prevents the use of such resources for other broadcast needs. If too many resources are reserved for paging at a given time, the system is inefficient. Conversely, when paging traffic is heavy, the reserved amount of broadcast resources for paging may be insufficient, and calls may not get completed timely or may be entirely missed. Moreover, if user stations are required to monitor the paging channel too frequently, the user stations use more power than they otherwise would, leading to wasted energy and/or battery life.

The problem of efficient paging traffic may be particularly acute in a wireless packet-oriented communication system. Often, each packet transmission from the base station requires a separate page. Where a large number of packets are transmitted from the base station, the paging overhead can be substantial, and inefficiencies in allocation of paging resources can substantially impact the system performance.

It would therefore be advantageous to provide a flexible paging technique for a mobile communication system in which paging resources are allocated in a manner more closely related to the actual paging traffic.

SUMMARY OF THE INVENTION

The invention provides in one aspect a flexible paging protocol which adjusts the allocation of resources for paging in response to the amount of actual paging traffic. Resources for paging are increased when paging traffic is heavy, and decreased when paging traffic is light. The user stations (e.g., mobile end systems) are preferably notified of the allocation of paging resources dynamically at each paging period.

In a preferred embodiment, a base station communicates with a plurality of mobile end systems which may be paged for incoming calls. The base station periodically transmits over a paging broadcast channel, which may be time-multiplexed with other channels. The periodicity of the paging channel is dynamically adjusted based on the amount of paging traffic. A paging packet message transmitted by the base station preferably comprises a set of paging messages and a next page pointer. The next page pointer identifies when the next set of paging messages (i.e., the next paging packet message) will be transmitted. A mobile end system monitoring the paging channel receives the next page pointer, and, if not being paged, sets its sleep or dormancy period based upon the amount of time remaining until the next paging packet message is transmitted by the base station.

When paging traffic is light, paging messages are sent infrequently, freeing up base station resources and allowing the mobile end system to remain asleep or dormant longer. When paging traffic is heavy, paging messages are sent more frequently, ensuring rapid response to the pages and reducing the probability of a missed call.

In one embodiment as disclosed herein, a base station communicates with a plurality of user stations using time division multiple. access (TDMA) techniques. The base station generates a repeating time frame comprising a plurality of time slots. One of the time slots (or possibly a time slot on another frequency) may be reserved for broadcast or other control traffic. Several logical channels, including a paging channel, may be multiplexed on to the same physical broadcast/control channel. When the paging channel is active, the base station may broadcast one or more paging messages, in the form of one or more paging packet messages, to mobile end systems monitoring the paging channel. As part of a paging packet message, the base station transmits a next page pointer, which preferably identifies the number of time frames until the next paging packet, and therefore the amount of time which will elapse until the mobile end systems need to next wake up to listen for pages. In a particular embodiment, the next page pointer comprises a set of N bits which together define $2^N$ different possible paging intervals until the next paging packet. For example, if N is 3 bits, a total of 8 different possible paging intervals until the next paging packet can be defined. The next page pointer can be encoded, so as to allow for a wide variation in the paging interval. For example, the next page pointer may be encoded such that 8 possible paging interval indicators correspond to intervals of 1, 2, 4, 8, 16, 32, 64 and 128 time frames between paging packets.

The next page pointer may be used in a system which employs a next slot pointer for increasing the speed of control traffic transactions. In such an embodiment, the message bits in a control traffic message ordinarily reserved for identifying the. next slot of a control traffic message are interpreted as identifying the time interval until the next paging packet is received.

A preferred embodiment disclosed herein is particularly well suited for a wireless packet-oriented communication system. In this embodiment, the base station receives data packets over a backhaul connection for transmission to mobile end systems. The base station transmits a paging message to each mobile end system for which a data packet has been received. When the mobile end system responds, the base station divides the data packet into a sequence of over-the-air packets, and transmits the over-the-air packets to the mobile end system in assigned time slots.

A technique for flexible paging is disclosed with respect to a preferred embodiment wherein the base station and mobile end systems communicate in TDMA time slots using spread spectrum encoded messages, and wherein data symbols are encoded using an M-ary direct sequence spread spectrum communication technique. Further variations and details of the above embodiments are also described herein and/or depicted in the accompanying figures.

DETAILED DESCRIPTION OF PREFERRED EMBODIMENTS

As disclosed herein, a flexible paging protocol in accordance with the invention may be utilized, for example, in a mobile communication system (such as a cellular telephone system) or in a wireless packet data services communication system. While preferred embodiments of the invention are disclosed herein with respect to certain types of communication systems, the details of which follow below, those skilled in the art will appreciate that the invention has wide applicability, and may be used in virtually any type of communication system requiring receiving terminals or other equipment to be paged.

Figure 1:
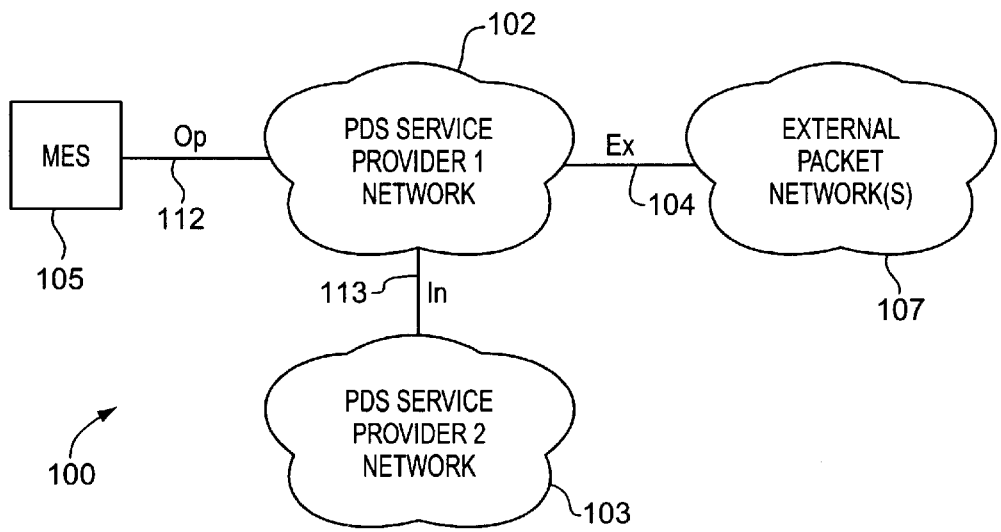
FIG. 1 is an abstract diagram showing service provider networks and external packet network(s).

FIG. 1 is an abstract diagram showing interconnectivity of service provider networks and external packet network(s) in accordance with a preferred packet data services communication system architecture as disclosed herein. As shown in FIG. 1, a communication system 100 may comprise a plurality of packet data services (PDS) service provider networks 102, 103, which may be connected over an internal network interface (IN) 113. A PDS service provider network (such as 102) may be connected to one or more external packet network(s) 107 over an external network interface (EX) 114. A mobile end system (MES) 105, which may be a computer terminal with a wireless modem, a fax machine, a mobile telephone, a video terminal, a personal digital assistant (e.g., PalmPilot™) with an integrated wireless modem, or any other electronic device with wireless communication capability, may connect to one of the PDS service networks (such as 102, as shown in FIG. 1) over a wireless or over-the-air interface (Qp) 112.

In a preferred embodiment, the communication system 100 provides a wireless extension of a data communication network such as the Internet. In such an embodiment, the PDS service provider network 102 or 103 may permit the use of Internet protocol (IP) to access services through the PDS service provider network 102 or 103, as well as services provided by the PDS service provider network 102 or 103. In one aspect, the PDS service provider network 102, 103 may be viewed as a wireless and mobile extension of traditional, wireline data networks, providing a seamless access capability to applications generally provided over wireline data networks.

While only a single MES 105 is depicted in FIG. 1, a single PDS service provider network 102 or 103 can support multiple MESs 105, with the total number depending in part upon the protocol used for communication over the wireless interface 112. In a preferred embodiment, a PDS service provider network 102, 103 in one aspect forms an overlay network to a mobile wireless communication network, such as a circuit-switched IS-661 compatible wireless communication network. In such an embodiment, the PDS service provider network 102 or 103 shares the base stations of the IS-661 wireless communication network, with certain elements dedicated to the PDS service provider network 102 or 103.

Figure 2:
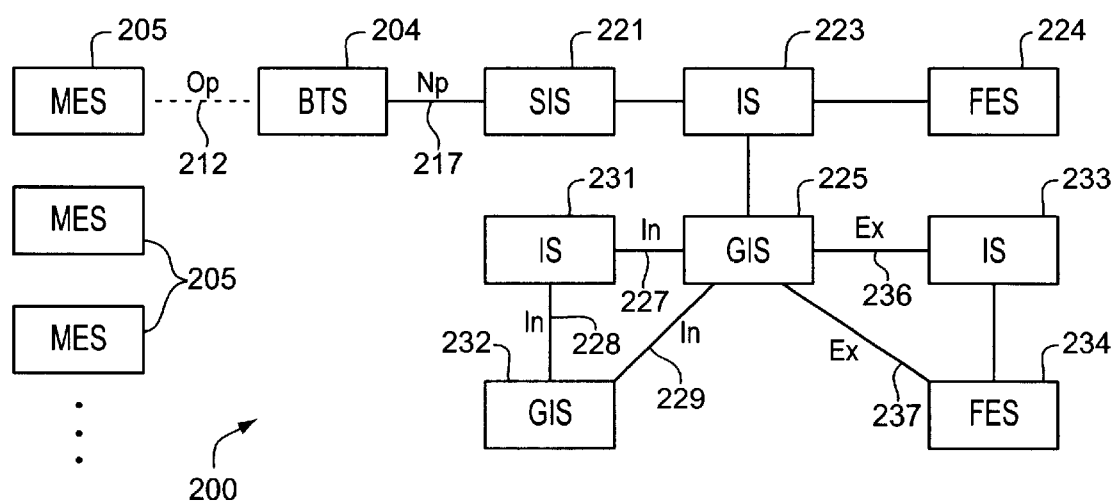
FIG. 2 is a diagram of a network architecture in accordance with a preferred embodiment of the present invention.

FIG. 2 is a diagram of a network architecture illustrating components of a PDS service provider network 102 or 103, in accordance with a preferred embodiment as disclosed herein. As shown in FIG. 2, one or more mobile end systems (MESs) 205 connect to a base station (BTS) 204 over a wireless interface (Op) 212, preferably utilizing a multiple-access protocol (such as FDMA, TDMA or CDMA, or a hybrid thereof) to enable multiple mobile end systems (MESs) to communicate "simultaneously" with the base station 204. The base station 204 preferably comprises an IS-661 compatible unit capable of supporting user stations (e.g., mobile telephones and the like) in accordance with the IS-661 protocol, in addition to providing data services needed by the PDS service provider network 102 or 103. As further shown in FIG. 2, the base station 204 is connected to a serving intermediate system (SIS) 221 over a signalling/data (Np) interface 217. The serving intermediate system 221 is connected to an intermediate system (IS) 223, which provides interconnectivity to other elements of the collection of switching elements in the PDS service provider network 102 or 103 (collectively referred to as the network switching subsystem, or NSS). The intermediate system 223 is connected to a gateway intermediate system (GIS) 225, which provides connectivity to other intermediate systems (such as 231 and 233), other gateway intermediate systems (such as 232), or fixed end systems (FES) (such as 234). The gateway intermediate system 225 may be connected through internal interfaces 227, 229 to elements (such as intermediate system 231 and gateway intermediate system 232) of another PDS service provider network, or through external interfaces (EX) 236, 237 to elements (such as intermediate system 233 or fixed end system 234) of an external packet network.

Figure 3:
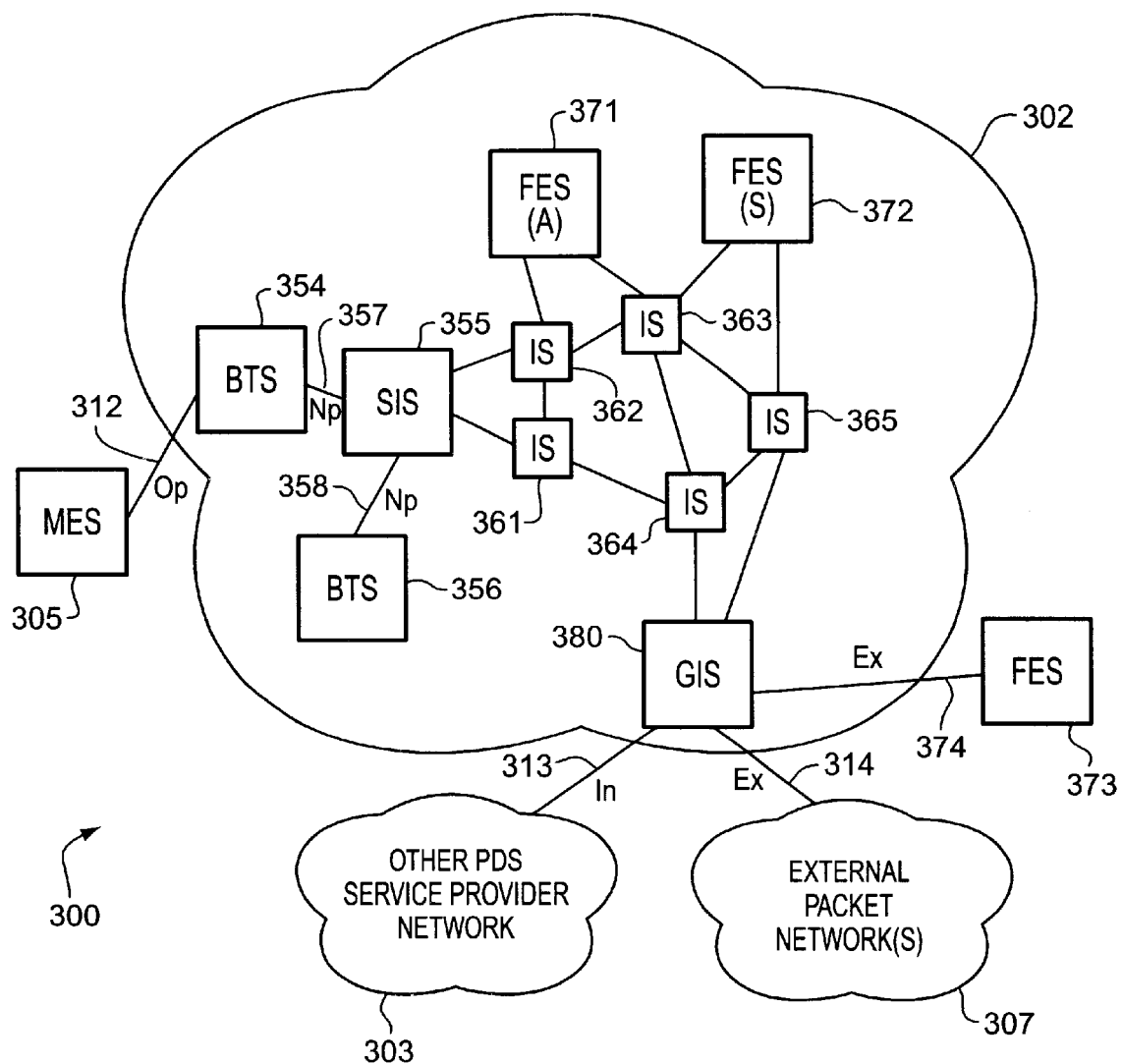
FIG. 3 is a diagram illustrating components of a service provider network.

FIG. 3 is a more detailed diagram of a preferred network architecture of a PDS service provider network, showing an illustrative arrangement of components of a PDS service provider network 302, and generally incorporating the concepts shown in-and described with respect to FIGS. 1 and 2. As shown in FIG. 3, an illustrative PDS service provider network 302 includes a plurality of base stations (BTS) 354, 356 (and possibly additional base stations), connected to a serving intermediate system (SIS) 355 over signalling/data interfaces (Np) 357 and 358, respectively. The base stations 354, 356 can communicate with mobile end systems (MESs), such as mobile end system 305, over a wireless interface (OP) 312. As described with respect to FIG. 2, the serving intermediate system 355 may be connected to one or more intermediate systems (IS) (such as 361 and 362, which themselves can be directly or indirectly connected to additional intermediate systems 363, 364, 365. The intermediate systems 361 through 365 can be connected to fixed end systems (FES) 371, 372 internal to the PDS service provider network 302, or to one or more fixed end systems (such as fixed end system 373) external to the PDS service provider network 302 via an external interface (EX) 374 provided by a gateway intermediate system (GIS) 380. As previously described with respect to FIG. 1, the PDS service provider network 302 can also be connected to another PDS service provider network 302 or to an external packet network 307 via the gateway intermediate system 380.

In one aspect, the PDS service provider network 302 enables the mobile end system(s) 305 to transmit and receive data to and from other equipment connected to the PDS service provider network 302. The mobile end systems 305 generally constitute the endpoints of communication and are typically the source or destination of network traffic. Each mobile end system 305 is preferably identified by a globally distinct network entity identifier (NEI), such as its Internet protocol (IP) address.

Fixed end systems (such as 372 and 373 in FIG. 3) generally comprise regular data network nodes (e.g., an Internet node) which communicate with the mobile end systems 305 through the PDS service provider network 302. Unlike the mobile end systems 305, which may be capable of changing their sub-network points-of-attachment dynamically, the fixed end systems 372, 373 generally have static sub-network points-of-attachment, and they may use network addresses associated with their locality.

The collective structure of the serving intermediate system 355 (or systems, if more than one), gateway intermediate system 380 (or systems, if more than one), and intermediate systems 361 through 365 generally implement the network layer functionality of allowing any pair of end systems (whether fixed or mobile) to communicate with each other. The network layer finds a path through the interconnected systems until the desired end system is reached. The systems along the path forward network layer packets in the appropriate direction, providing functions of route calculation, fragmentation, re-assembly, and congestion mitigation functions.

The serving intermediate system 355 in one aspect comprises a platform which performs packet routing functions based on the knowledge of the current location of the target mobile end system 305. The serving intermediate system 355 uses a mobile IP protocol to exchange location information about the mobile end system(s) 305 with other serving intermediate systems.

The base stations 354, 356 (and possibly others) connected to the serving intermediate system 355 may be geographically dispersed in different cells of a geographical area, referred to as the serving area of the serving intermediate system 355. The serving area may cover multiple routing areas, with each routing area comprising one or more cells. Each cell may be controlled by a transmit/receive unit in a base station 354 or 356, the transmit/receive unit acting as a data link relay system between the mobile end system 305 and its current serving intermediate system 355.

In a preferred embodiment, the serving intermediate system 355 performs certain functions which allow the PDS service provider network 302 to provide location independent service to the mobile end systems 305. Two of these functions are referred to herein as a home agent function and a foreign agent function. Each mobile end system 305 is preferably associated with a fixed home area, and the home agent function provides a mobility-independent routing destination (e.g., IP address) for intermediate systems (such as 361 through 365) and fixed end systems (such as 372 and 373) which are not aware of mobility of the mobile end system 305. In this regard, the home agent function may provide a packet forwarding service, and maintain a database of the current serving area for each of its mobile end systems 305. The packet forwarding may be based on a mobile IP protocol which provides encapsulation of mobile-end-system addressed packets, and forwards them, if necessary, to the foreign agent function in the current serving intermediate system for the mobile end system 305. The home agent function may also provide authentication and other access control functionality, as well as subscriber profile control functionality.

The foreign agent function provides the routing of packets for visiting mobile end systems 305 within its serving area. When a mobile end system 305 registers with its home agent function, the foreign agent function issued as the relay for registration. Once the home agent function accepts the registration request of a mobile end system 305, the foreign agent function also updates its database to add the mobile end system 305 to its list of currently visiting mobile end systems 305.

The gateway intermediate system 380 in one aspect comprises a platform which connects a PDS service provider network 302 to another PDS service provider network 303, to an external packet network 307, or to an external fixed end system 373. The gateway intermediate system 380 thereby acts as the gateway between the internal elements of the PDS service provider network 303 and external entities. The gateway intermediate system 380 may provide protection from invalid or unauthorized use of the PDS service provider network 302, and control or limit the privileges and access available to external entities (e.g., firewalling).

The mobile end system 305 in one aspect comprises the platform which provides subscribes of the PDS service provider network 302 with access to services provided by the PDS service provider network 302. The mobile end system 305 may be mobile or stationary, but is treated by the PDS service provider network 302 as at least potentially mobile. The mobile end system 305 communicates with a base station (such as 354) of the PDS service provider network 302 using a wireless communication protocol such as the IS-661 protocol, adapted as necessary for supporting packet-oriented data communication. Although the physical location of a mobile end system 305 may change over time, continuous network access may be maintained so long as the mobile end system 305 is within the coverage (i.e., service) area of the PDS service provider network 302. Due to its mobility, a mobile end system 305 can dynamically change its point-of-attachment to the PDS service provider network 302. The mobile end system 305 and PDS service provider network 302 may therefore include mobility management functionality to track the current sub-network point-of-attachment of the mobile end system 305 and routing of network-layer packets, as well as radio resource management functions to discover and maintain connectivity to a suitable sub-network point-of-attachment.

In a preferred embodiment, the PDS service provider network 302 provides support services which enhance the service provider's ability to manage the network, collect accounting data, and protect the network from unauthorized use. Such support services may include, for example, authentication, subscriber identity confidentiality, subscriber data confidentiality, data compression, accounting, and network management (e.g., fault, configuration, performance and security management functions).

Figure 4:
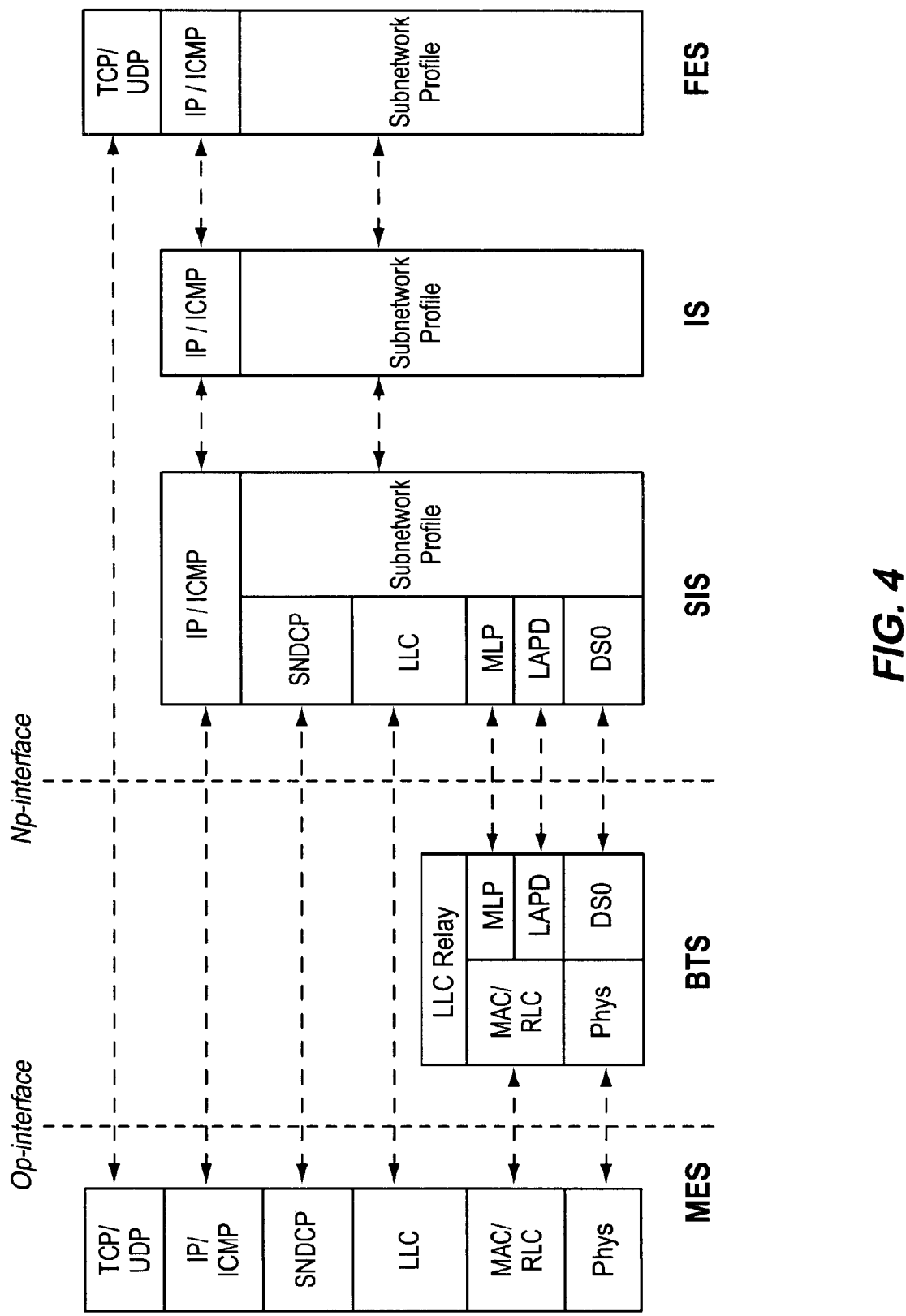
FIG. 4 is a diagram of a service provider network user plane protocol stack.
Figure 5:
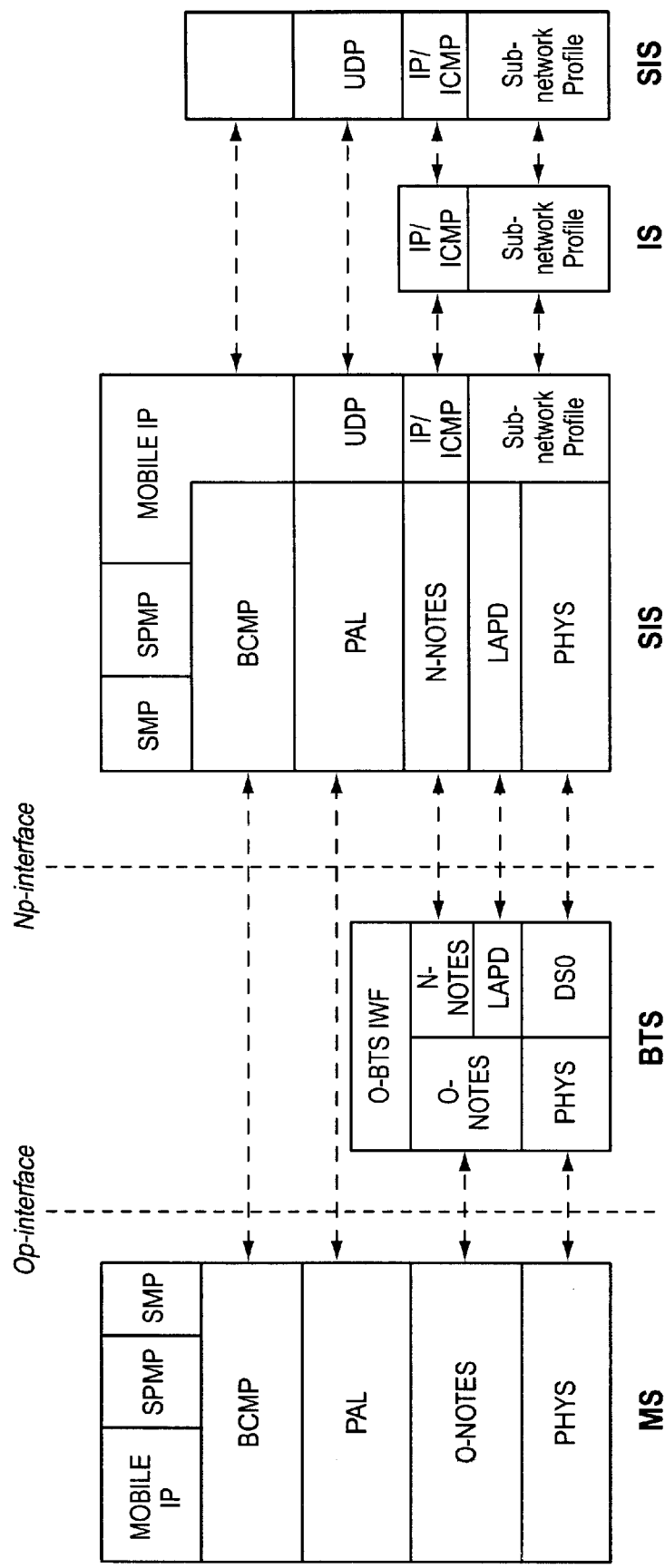
FIG. 5 is a diagram of a service provider network control plane protocol stack.

In a preferred embodiment, the PDS service provider network 302 uses an Internet protocol (IP) to provide network-layer services. FIGS. 4 and 5 are diagrams illustrating network protocol stacks associated with a preferred embodiment in accordance with the PDS service provider network architecture shown in FIG. 3. More specifically, FIG. 4 is a diagram of a service provider network user plane protocol stack, and FIG. 5 is a. diagram of a service provider network control plane protocol stack. In FIGS. 4 and 5, "Phys" refers to the physical layer (i.e., the wireless protocol), "UDP" refers to user datagram protocol, "IP/ICMP" refers to Internet protocol/Internet control message protocol, "LAPD" refers to link access protocol for the D-channel, "DSO" refers to a physical link used for backhaul data transfer (generally a digital channel having a 64 kb/s data transfer rate), "OP-INTERFACE" refers to wireless or over-the-air interface, "NP-INTERFACE" refers to signalling/data interface, "SIS" refers to service intermediate system, "IS" refers to intermediate system, and "BTS" refers to base station.

In FIG. 4, "MAC/RLC" refers to media access control/radiolink control, "LLC" refers to logical link control, "SNDCP" refers to sub-network dependent convergence protocol (BSS protocol), "TCP/UDP" refers to transmission control protocol/user datagram protocol, "MES" refers to mobile end system, and "MLP" refers to multi-link protocol (for combining multiple DS0 channels).

In FIG. 5, "PAL" refers to protocol adaptation layer (for mapping the overlying protocols), "O-NOTES" refers to the over the air notes interface used for OTA (over the air) signaling and control, "N-NOTES" refers to the network notes interface used for backhaul signaling and control, "MS" refers to mobile station, "BCMP" refers to base station subsystem (BSS) connection management protocol which functions in the network, "SMP" refers to security management protocol for security management functions in the network, "SPMP" refers to subscriber profile management protocol for security management functions in the network, "MOBILE IP" used for macro-level mobility management in the network, and "O-BTS IWF" refers to the omnipoint-base transceiver system (O-BTS) interworking function (IWF) for providing mapping of 0-notes onto N-notes and vice versa for support for end to end procedures between the MES and SIS.

In a preferred embodiment, each mobile end system 305 is equipped with a subscriber identity module (SIM) which carries one or more unique IP addresses. The mobile end system 305 may use the IP address carried by the SIM as its network entity identifier. The IP address may be associated with a home agent function in a serving intermediate system 355 which serves as the packet forwarding node for the packets addressed to the mobile end system 305.

Communication may be established between the mobile end system 305 and a base station 354 when the mobile end system 305 logs on using a handshaking process. At log-on, the base station 354 (or other entity) may authenticate the requesting mobile end system 305, initiate encryption (if provided) and configures a logical link connection (LLC) to allow exchange of LLC frames between the mobile end system 305 and the serving intermediate system 355. During the log-on procedure, a temporary logical link identifier (TLLI) may be assigned to the link, so as to distinguish it from other links. The TLLI may have an encoded header which identifies the type of link (e.g., point-to-point, point-to-multipoint, etc.). The LLC protocol employed in a preferred embodiment may be generally similar to the link-access protocol for the D-channel (LAPD), which is a known protocol.

In a preferred embodiment, the medium access control (MAC) protocol (as shown in, for example, FIG. 4) is responsible for controlling access to radio resources in both the uplink and downlink directions. However, procedures for controlling the radio resources may differ in each direction. For example, the downlink media access control (MAC) protocol preferably manages a flexible paging channel for contacting mobile end systems 305, as further described below, whereas the uplink media access control protocol has alternative mechanisms for controlling radio resources. The mobile end systems 305 also preferably employ a sleep mode that provides certain advantages, especially when used in conjunction with the flexible paging channel described herein. A sleep mode is a low-power state in which, to the maximum extent possible, the internal circuitry of the mobile end system 305 is disconnected from the internal clock signals, so that internal switching activity is brought to a minimum. Preferably, the internal digital circuitry of the mobile end system is implemented using a CMOS or other process which results in circuit components which maintain their logic states in a static fashion when internal clocking activity is halted.

Implementation of a sleep mode in a mobile end system 305 is conventional and considered well within the purview of those skilled in the art. For example, a processor or controller within the mobile end system 305 may load a hardware or software timer with a time-out value prior to entering a sleep mode. The sleep mode may be entered by writing a command from the controller or processor which has the effect of disconnecting and/or shutting down the internal clocks, with the exception of the clocking necessary to operate the timer. When the timer times out, a signal is sent to the clock control circuitry, which, in response thereto, re-activates the internal clocking signals of the mobile end system 305, thereby causing the mobile end system 305 to exit the sleep mode. Preferably, the mobile end system 305 comprises a digital microprocessor or micro-controller which is programmed to cause the mobile end system 305 to enter the sleep mode when desired, and to recover when the sleep mode is exited. When the mobile end system 305 leaves the sleep mode, the operation of the mobile end system 305 may resume from where it left off (i.e., the micro-processor or micro-controller may execute the next instruction in the program), or else the program may jump or branch to a post-sleep processing routine.

As will be described in more detail below, the mobile end system 305 periodically receives paging packet messages which indicate when the next paging packet message will be received, preferably using an information element (referred to as a next page pointer) which indicates the number of frame intervals before the next paging packet message is received. Upon receiving a next page pointer, the mobile end system 305 may calculate the actual time until the next paging packet message is received, and load a time value corresponding to that amount of time (or slightly less than that amount of time) into a timer, prior to entering a sleep mode. When the timer times out, the mobile end system 305 will exit the sleep mode, as described above.

A preferred embodiment of a communication system and protocol utilizing a flexible paging channel is described below with reference to FIGS. 6 through 9. According to one aspect of the preferred embodiment illustrated in FIGS. 6 through 9, a flexible paging protocol is employed whereby the allocation of channel resources for paging is a function of the amount of actual paging traffic. For example, resources for paging are increased when paging traffic is relatively heavy, and decreased when paging traffic is relatively light. The user stations are preferably notified of the allocation of paging resources dynamically at each paging period, as further described below, although the user stations may be notified at other intervals in time and in other manners than those set forth in respect to the preferred embodiment(s).

Figure 8:
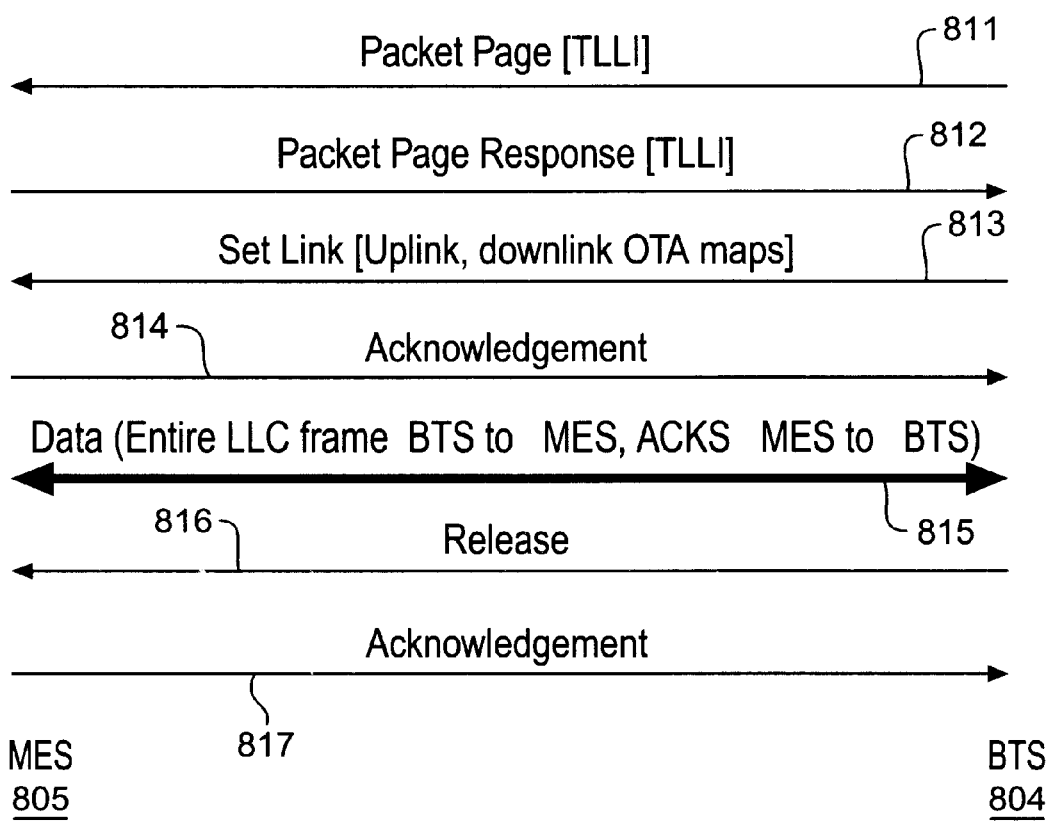
FIG. 8 is a call flow diagram illustrating a procedure for downlink resource allocation via a packet page.

In more detail, FIG. 8 is a call flow diagram in accordance with one embodiment illustrating a procedure for downlink resource allocation via a packet page, under control of the downlink media access protocol (MAC). As shown in FIG. 8, a base station (BTS) 804 (such as base station 204 shown in FIG. 2, or base station 354 shown in FIG. 3) communicates with an mobile end system (MES) 805 (such as mobile end system 204 shown in FIG. 2, or mobile end system 305 shown in FIG. 3). According to the procedure for downlink resource allocation illustrated in FIG. 8, the base station 804 for the cell in which the mobile end system 805 is located transmits a packet page message 811 to the mobile end system 805. The cell in which the mobile end system 805 is located should be know, if the logical link control (LLC) is in the active state, as described above. The packet page message 811 is referenced by a temporary logical link identifier (TLLI). Upon receiving the packet page message 811, the mobile end system 805 responds with a packet page response message 812, which is also referenced by the temporary logical link identifier (TLLI).

Upon receiving the packet page response message 812, the base station 804 transmits a set-link message 813 to the mobile end system 804. The set-link message 813 may include, for example, if the communication system employs TDMA, an over-the-air slot map for both the downlink (LLC frame segments) and the uplink (for aggregated acknowledgments). If the first (or subsequent) page is missed by the mobile end system 805, resulting in no packet page response 812 being received by the base station 804, a repeat packet page message (up to a predefined maximum) will be sent.

Upon receiving the set-link message 813, the mobile end system 805 responds with an acknowledgment message 814. Once it has received the acknowledgment message 814, the base station 804 commences delivery of radio link control frames to the mobile end system 805, with the mobile end system 805 periodically responding with aggregated acknowledgments. This exchange of messages is illustrated by the bidirectional message arrow 815 in FIG. 8. When the base station 804 receives the final acknowledgment of the last outstanding radio link control frame, the base station 804 transmits a release message 816 to the mobile end system 805. The mobile end system 805 responds to the release message with an acknowledgment message 817.

In many packet data systems, it is important to provide a highly efficient paging process, since the number of such pages for a given volume of data transfer is orders of magnitude larger than for circuit switched data. In a preferred embodiment as described herein, such a paging process is provided by compressing multiple pages into a single over-the-air burst, and by increasing the likelihood that the mobile end system 805 will locate the first page. The compression of multiple pages into a single over-the-air burst is preferably achieved, as further described below, by sending a minimum amount of information for each target user (i.e., the mobile end systems 805) to allow the target user to respond and set up a bidirectional communication link. The likelihood of a mobile end system 805 locating the first page targeted for it is, in a preferred embodiment, increased by sending with each paging message a next page pointer which indicates the time interval until the next paging message, thereby indicating to the mobile end system 805 exactly when it should check for the next paging message. Further details regarding these processes are described below.

Figure 6:
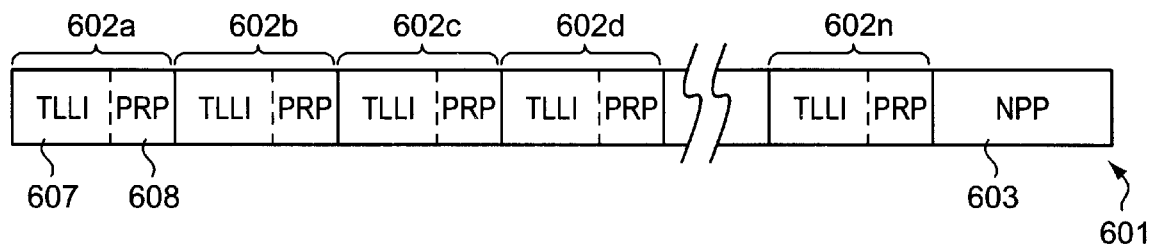
FIG. 6 is a diagram showing details of a paging packet message format including a next page pointer.

In a preferred embodiment, each paging message sent by the base station 804 over the paging channel is in a packet format, and comprises a set of individual paging message portions and a next page pointer. FIG. 6 is a diagram showing details of a paging packet message format in accordance with a preferred embodiment. As shown in FIG. 6, a paging packet message 601 comprises a plurality of individual paging message portions 602a, . . . , 602n and a next page pointer (NPP) 603. Each individual paging message portion 602 preferably comprises a temporary logical link identifier (TLLI) 607 and a paging response pointer (PRP) 608. The TLLI 607 identifies the target mobile end system 805 for which the individual page is intended, and the paging response pointer (PRP) 608 identifies the next time slot(s) to be used for a paging response by the target mobile end system 805. The number of individual paging message portions 602a, . . . , 602n that can be transmitted in a single paging packet message 601 depends primarily upon the relative length of the individual paging message portions 602 and the total length of the paging packet message 601. In a preferred embodiment, each TLLI 607 is eighteen bits in length, the paging response pointer 608 is six bits in length, and the number of individual paging message portions 602 is four, allowing up to four separate mobile end systems 805 to be paged with a single paging packet message 601.

As noted previously, the next page pointer 603 transmitted as part of the paging packet message 601 indicates when the next paging message will be sent. In a preferred embodiment, the next page pointer 603 comprises a binary numerical value which indicates a number of time frames until the next paging message will be sent. The next page pointer 603 may be encoded so as to provide a discrete number of possible frame intervals before the paging message is repeated; for example, in one embodiment the next page pointer 603 comprises three bits providing up to eight next page pointer values indicating the number of frame intervals n before the next paging message, where n corresponds to one of eight possible values (e.g., 1, 2, 4, 8, 16, 32, 64 or 128). In such an embodiment, the next page pointer 603 indicates how many time frames (1, 2, 4, 8, 16, 32, 64 or 128) will elapse until the next paging message is sent. However, the next page pointer 603 may be any number of bits as appropriate for the particular communication protocol, and the number of dormant time frame intervals represented thereby need not be increased by powers of two (e.g., 1, 2, 4, 8 . . . ) but may be increased more rapidly or more slowly, depending upon the particular system requirements. The main criterion is that a sufficient number of choices for the value of the next page pointer 603 be provided such that the paging channel bandwidth can be meaningfully varied in relation to the expected user traffic.

Figure 9:
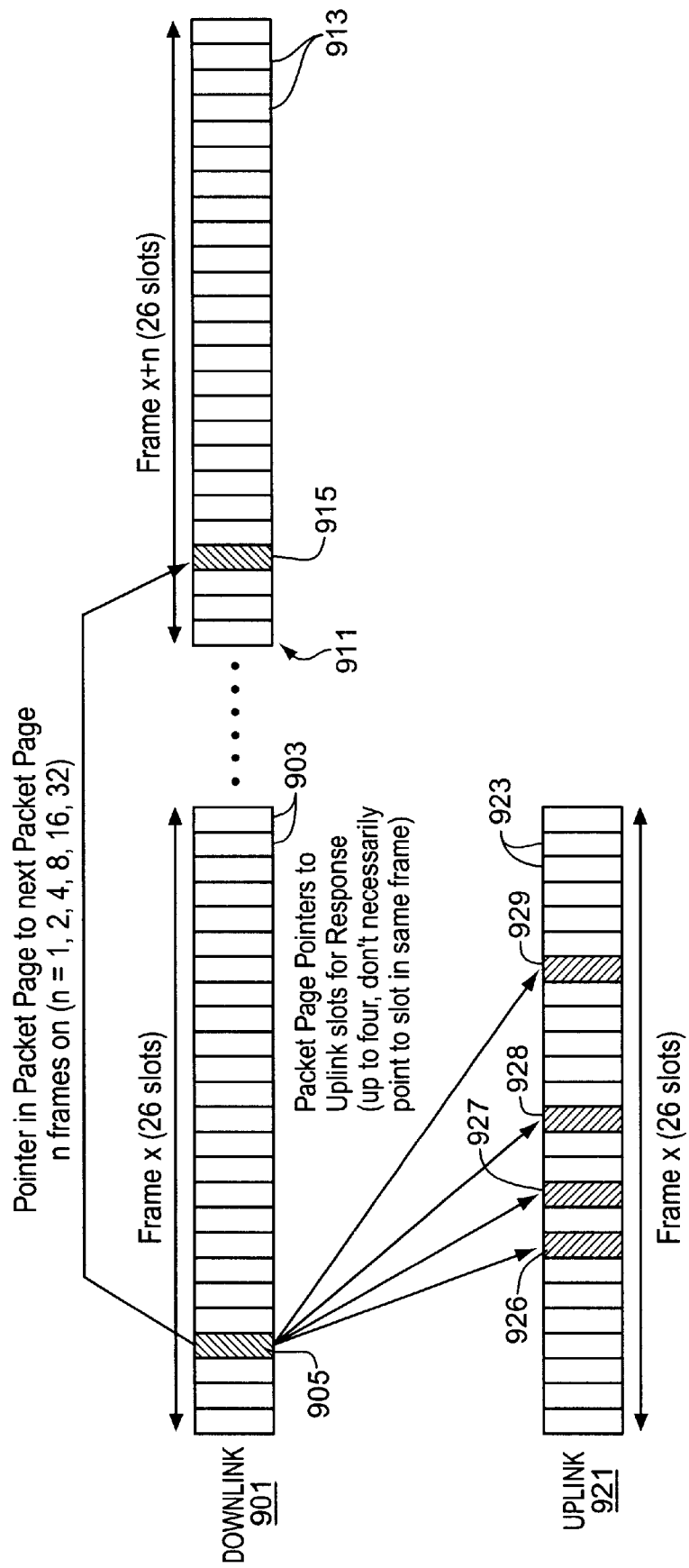
FIG. 9 is a diagram illustrating a downlink paging process.

In operation, each paging packet message 601 indicates to the mobile end systems (MES) 805 both the time location of the page response, and the time location of the next paging message. FIG. 9 is a diagram illustrating in more detail an example according to a preferred downlink paging process. According to the example shown in FIG. 9, the base station (BTS) 804 transmits in the downlink direction using a time division multiple access (TDMA) technique, wherein time frames 901, 911 are divided into a plurality of time slots 903, 913, respectively. For example, time frames 901, 911 may be divided into 26 time slots 903, 913 apiece, or any other suitable number of time slots 903, 913. Mobile end systems 805 transmit in the uplink direction, preferably over a different frequency band than the base station (although not necessarily, if the base station and mobile end system transmissions can be distinguished in other ways, such as by use of distinct codes). The mobile end systems 805 transmit in assigned time slots 923 of an uplink time frame 921.

In the example shown in FIG. 9, a paging channel is defined on a fixed time slot 903, such as the fourth time slot 905 of downlink time frame 901. During the fourth time slot 905, the base station 804 transmits a paging packet message (such as paging packet message 601) to mobile end systems 805 within listening distance. The paging packet message 601 may, as described with respect to FIG. 6, be divided into a plurality of individual paging message portions 602. Each paging message portion 602 may be directed to a different mobile end system 805; however, more than one paging message portion 602 may be directed to the same mobile end system 805. The mobile end systems 805 receive and parse the paging packet message 601 into its constituent components (i.e., the individual paging message portions 602). If the temporary logical link identifier (TLLI) 607 from any of the individual paging message portions 602 matches the one assigned to the mobile end system 805, then the mobile end system 805 knows that it is being paged by the base station 804. The mobile end system 805 is instructed when to respond to the page, by looking at the next field in the individual paging message portion 602—i.e., the paging response pointer 608. The paging response pointer 608 indicates the number of time slots until the mobile end system 805 should respond.

For example, in FIG. 9 the paging packet message 601 sent in the fourth time slot 905 (i.e., the paging channel) may contain four individual paging message portions 602, each of which identifies a time slot 923 in the uplink time frame for a page response for the particular mobile end system 805. In FIG. 9, the paging response pointers 608 of the paging packet message 601 point to (i.e., identify) time slots 926, 927, 928 and 929 in the uplink time frame. Accordingly, up to four mobile end systems 805 will respond in time slots 926, 927, 928 and 929, respectively.

Each mobile end system 805 responding to a page then carries out the process described above with respect to FIG. 8. In other words, the mobile end system 805 sends a packet page response message 812 including its assigned TLLI, receives a set link message 813, and responds with an acknowledgment message 814 before exchanging further data messages (indicated by bidirectional arrow 815). Preferably, over-the-air time slot maps are excluded from the paging packet message 601, because of the large amount of space they require. The set link message 813 is preferably used to send the over-the-air time slot map to the mobile end system 805. However, alternatively, the paging packet message 601 can be lengthened to include over-the-air time slot map information for each individual mobile end system 805, or may include a common over-the-air time slot map which all of the mobile end systems 805 listening to the paging packet message 601 can use as a reference.

The example of FIG. 9 also illustrates how the next page pointer (NPP) 603 of the paging packet message 601 is preferably employed. The next page pointer 603 points to (i.e., identifies) the next time frame 911 in which a paging message will be sent by the base station 804. Time frame 911 is thus n time frames after the first time frame 901, where n is the encoded value represented by the next page pointer 603. For simplicity of implementation, the paging channel is preferably fixed as the same time slot (i.e., the fourth time slot 915 of time frame 911, in the example of FIG. 9) in any time frame in which a paging message is sent by the base station 804. However, in other embodiments, the paging channel need not be in a fixed time slot location.

Figure 7:
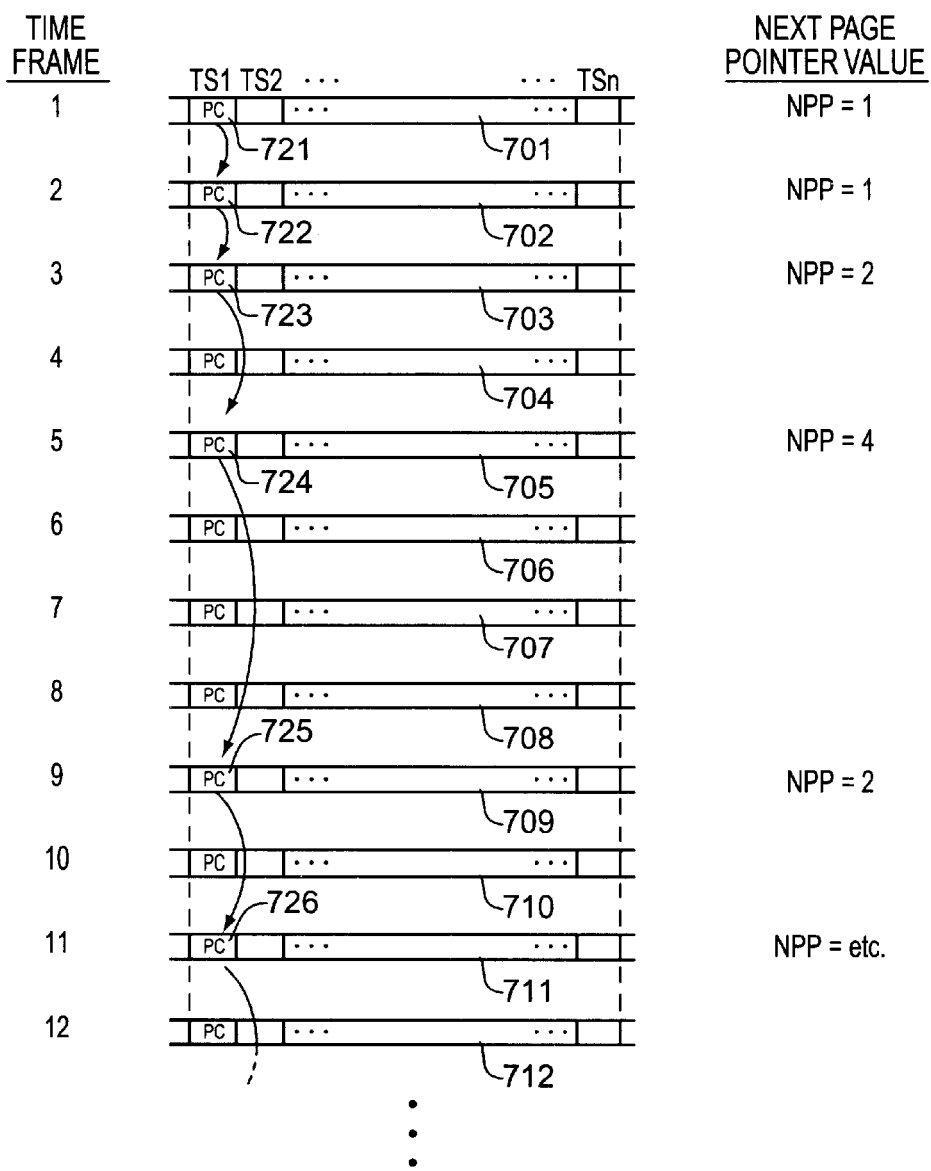
FIG. 7 is a diagram illustrating use of the next page pointer to dynamically adjust paging bandwidth.

FIG. 7 is a diagram illustrating in more detail use of the next page pointer (NPP) to dynamically adjust paging bandwidth. In FIG. 7, a series of twelve consecutive downlink time frames 701, . . . , 712 are shown. Each time frame 701, . . . , 712 is divided into a plurality of time slots TS1, . . . , TSN (e.g., 26 time slots). In the example of FIG. 7, the paging channel (PC) is fixed as the first time slot TS1 in each time frame in which a paging message is sent. The paging channel may be multiplexed in time slot TS1 with other logical channels, most likely other broadcast and/or signalling channels.

In the first time frame 701 shown in FIG. 7, a paging packet message 721 is sent in the first time slot TS1. The paging packet message 721 comprises a next page pointer indicating that the next paging packet message will be sent one time frame later; i.e., the next page pointer has a value of 1 (when decoded). Consequently, the mobile end systems 805 will expect the next paging packet message to be sent in the next time frame 702. Similarly, in the next time frame 702, the base station (BTS) 804 transmits another paging packet message 722 in the first time slot TS1. The paging packet message 721 in the second time frame 702 also comprises a next page pointer which, for example, indicates that the next paging packet message will be again sent one time frame later. Again, the mobile end systems 805 will expect to see the next paging packet message in the immediately following time frame 703.

In the third time frame 703, a paging packet message 723 is again transmitted in the first time slot TS1. The next page pointer of paging packet message 723 in this case indicates that the next paging packet message will be sent two time frames later. Accordingly, no paging packet message is transmitted during the fourth time frame 704, but a paging packet message 724 is transmitted during the fifth time frame 705. The paging packet message 724 indicates that the next paging packet message will be sent four time frames later. Accordingly, no paging packet message is transmitted during the sixth, seventh or eighth time frames 706, 707, 708, but a paging packet message 725 is transmitted in the first time slot TS1 of the ninth time frame 709. The paging packet message 725 in this instance indicates that the next paging packet message will be transmitted in two time frames. Accordingly, no paging packet message is transmitted during the tenth time frame 710, but a paging packet message 726 is transmitted in the eleventh time frame 711. The process continues, allowing continuous adjustment of the paging channel bandwidth by the base station 804.

The base station 804 generally adjusts the paging channel bandwidth in response to the amount of paging traffic. If the base station 804 has received a relatively large number of pages for end mobile systems 805 in its region, then it will increase the paging channel bandwidth by transmitting paging packet messages more frequently (depending on resource availability). Conversely, if the base station 804 has received a relatively small number of pages for end mobile systems 805 in its region, then it will decrease the paging channel bandwidth by transmitting paging packet messages less frequently, thereby increasing communication resources for other uses. At the same time, the mobile end systems 805 monitor the paging packet messages as they are sent, and are thereby apprised of exactly when the next paging packet message should arrive. The mobile end systems 805 may therefore adjust their low-power or "sleep" time to correspond to the time in which no paging messages from the base station 804 are expected, thus maximizing power savings.

As one advantage of the above-described flexible paging process, each mobile end system 805 has a high likelihood of locating the first page notification directed to it, and has a reduced chance of missing pages because of its low-power or sleep state interfering with paging message reception. In one aspect of the flexible paging process, individual paging messages for one or more mobile end systems 805 are aggregated and carried over a paging channel (which is preferably multiplexed over a downlink "slow" control channel). When a mobile end system 805 first enters an active logic link control (LLC) state, it monitors the downlink slow control channel until it locates a paging packet message. Once a paging packet message has been found, the mobile end system 805 is able to find all future paging packet messages by virtue of the next page pointer 603 contained within each such message. Because the mobile end system 805 will have advance knowledge when each paging message will be sent, regardless of paging message traffic, it should be able to locate the first page targeted to it, thus reducing total paging traffic overhead at the base station 804.

The paging traffic load may depend on such factors as the proportion of packet-type data (as opposed to non-packet data) in a cell, and the average size of the data packets. In one implementation, relatively small packet sizes (e.g., 128 bytes) utilizing virtually all of the over-the-air resources may produce a required page rate on the order of 1.5 pages per frame, which may be supported by the paging channel repeating every two time frames (assuming up to four pages per paging packet message 601). Relatively large packets (e.g., 576 bytes) utilizing one-quarter of the over-the-air resources may produce a required page rate on the order of once every five frames, which may be supported by the paging channel repeating every 16 time frames (again assuming up to four pages per paging packet message 601). The amount of packet-type data being transmitted by a particular base station 804 in a cell largely depends on the nature of the mobile end systems 805 with which it communicates at a given time, but in at least some embodiments communication will not necessarily be dominated by packet-type data. The less packet-type data being sent, the less frequently the paging channel needs to be repeated.

As indicated above, the mobile end system 805 is preferably configured with sleep (i.e., low power) mode for its electronic circuitry which is principally employed to help conserve battery life. When a mobile end system 805 is in a sleep mode, it generally is not capable of receiving paging messages.

In a preferred embodiment, the method of sleep mode differs according to whether the mobile end system 805 is in an "active" logic link control (LLC) state or a "standby" LLC state. If in an active LLC state, then the mobile end system 805 is essentially locked on to the packet paging channel. The mobile end system 805 wakes up on a predictable basis, as determined by the next page pointer 603 in the packet paging message 601, and reads the page data in the packet paging message 601 to determine whether to wake up fully for data transfer or else return to the sleep mode in the active LLC state. In some embodiments, the mobile end system 805 will only remain in an active LLC state for short periods of time, when exchanging multiple LLC frames related to a larger volume of application layer data (for example, transfer of a 200 kilobyte file). Mobile end systems 805 may in certain circumstances be aggregated into paging groups to extend the "sleeping" period, but doing so may introduce unwanted delays in data delivery due to the length of the sleeping period.

If the mobile end system 805 is in a standby LLC state, as opposed to the active LLC state, then the mobile end system 805 behaves in the sleep mode as any other user or mobile station (MS) attached to the circuit-based network. That is, the mobile end system 805 periodically listens for pages related to the LLC activation procedure (which differ from paging packet messages transmitted during the exchange of packet data). When the mobile end system 805 hears a page related to the LLC activation procedure, it enters the active LLC state and takes appropriate action.

Whenever a mobile end system 805 is in the standby LLC state and enters a cell which is in a new routing area served by the same serving intermediary system (SIS), the mobile end system 805 preferably performs a routing area update. The mobile end system 805 acquires a communication channel in the new routing area and transmits a routing area update request to the base station 804. The base station 804 acknowledges the routing area update request, and forwards it to the appropriate serving intermediary system (SIS). When the serving intermediate system responds with a routing area update respond message, the base station 804 transmits a routing area update complete message to the mobile end system 805. The communication channel between the base station 804 and mobile end system 805 may then be relinquished.

An LLC connection through the packet data services base station subsystem may be difficult to maintain when a mobile end system 805 moves to a new cell which is not attached to the same serving intermediary system (SIS). Consequently, a different procedure for routing area update is thus preferably employed in these situations. The mobile end system 805 performs a log-in to the new serving intermediary system (SIS). A new LLC link with a new temporary logical link identifier (TLLI) is established between the mobile end system 805 and the new serving intermediary system (SIS). It is possible that some user data may be temporarily lost in such a transfer, but such an occurrence should be infrequent, and higher layer protocols are generally capable of recovering any lost data. Since temporary logical link identifiers may be re-used between different serving intermediary systems, it is generally not possible to initiate a change between serving intermediary systems simply by sending a routing area update request, nor may a log-in request with the new serving intermediary system be sent in an encrypted form because the serving intermediary system will not have knowledge of the appropriate encryption parameters. The old temporary logical link identifier (TLLI) and context present in the previous serving intermediary system (SIS) are erased following expiry of network level registration timers, since a periodic registration will not be received by the old serving intermediary system.

When a mobile end system 805 is in a standby LLC state, it is possible for it nevertheless to send and receive data by entering the active LLC state. The process by which a link in standby LLC state moves to the active LLC state may be referred to as LLC connection activation, and may differ for mobile-originating (i.e., data to be sent from the mobile end system 805) and mobile-terminating data transmissions (i.e., data to be sent to the mobile end system 805). For the latter situation, when the mobile end system 805 is in a standby LLC state, the serving intermediary system (SIS) is generally aware of the location of the mobile end system 805 only to within a single routing area, which may cover many cells.

To send a data packet to the mobile end system 805, the serving intermediary system (SIS) could forward the data packet to every base station 804 within the routing area, but doing so may be wasteful of backhaul bandwidth and base station buffer capacity. Accordingly, it is preferred that the serving intermediary system (SIS) first employs a procedure to determine the exact cell location of the mobile end system 805.

In one embodiment, to pinpoint the cell location of the mobile end system 805, the serving intermediary system (SIS) sends a retrieve location message, referenced by the temporary logical link identifier (TLLI), to all of the base stations 804 within the routing area associated with the particular logical link control (LLC) connection. Upon receiving the retrieve location message, each base station 804 transmits a paging message, referenced by the temporary logical link identifier (TLLI), similar to circuit switched paging procedures (which may result in transmission of several pages). Upon receipt of the paging message, the target mobile end system 805 responds with a page response message. Upon receipt of the page response message, the appropriate base station 804 sends an acknowledgment back to the mobile end system 805, and the LLC link enters the active state at the mobile end system 805. The acknowledgment returned to the mobile end system 805 may be implicit in a link release procedure, should the wireless communication link with it no longer be required, having served its purpose of locating the mobile end system 805. The base station 804 also forwards a location reply message to the serving intermediary system (SIS), indicating the appropriate temporary logical link identifier (TLLI) and the base station ID of the cell in which the mobile end system 805 responded. The location information associated with the LLC connection is thereby updated, and the LLC link enters the active state on the side of the serving intermediary system (SIS). With the LLC connection in the active state, LLC frames may be delivered in the manner described elsewhere herein.

For mobile-originated data, the procedure is somewhat simpler. In such a case, the mobile end system 805 undergoes a media access control (MAC) procedure and sends its data in the normal manner, causing the LLC connection to enter the active state at the side of the mobile end system 805. When the serving intermediary system (SIS) receives a mobile-originated LLC frame with a temporary logical link identifier (TLLI) corresponding to a connection in the standby state, the serving intermediary system updates the location information to the base station ID (based on the port on which the data arrives) and moves the LLC connection to the active state.

Packet data may be transmitted in any of a wide variety of formats which are dependent upon the specifics of the particular wireless communication system in which the invention is utilized. In a preferred embodiment, packet data is divided into frames, and each data frame transmitted over a wireless connection comprises the following physical fields:

Header

Address

Control

Payload

Error Protection

The header field preferably comprises, among other things, an identification of the message type as user-plane data traffic. The address field preferably comprises a radio link control address. A radio link control address (or correlative ID) is preferably allocated to each radio link control link as part of the media access control (MAC) resource allocation procedures. The radio link control address is preferably only temporary, being allocated when a user is physically transmitting over the air, but released once the transmission is complete for re-allocation to other users. The radio link control address can be relatively short in length since it only needs to be long enough to uniquely identify the communication channel at the particular base station. The control field preferably contains a sequence number subfield indicating the sequence of the data frame relative to the other data frames being sent, and a "more data" bit which indicates whether further data frames follow the current data frame. The payload field is used for carrying the user data (i.e., the LLC frames) and generally comprises the largest part of the data frame. The error protection field may be used for information relating to forward error correction or other types of error protection.

Upon receipt of the LLC frame data, the recipient may respond with an acknowledgment for each data frame received or, preferably, an aggregate acknowledgment message which indicates which data frames were and were not successfully received. Re-transmitted data frames are sent with the sequence number embedded in the control field, as described above, to allow re-construction of the entire data packet.

From the foregoing discussion, it is apparent that a flexible paging protocol is provided in various embodiments in which the allocation of resources for paging is adjusted in response to the amount of actual paging traffic. Resources for paging are increased when paging traffic is heavy, and decreased when paging traffic is light. Mobile end systems or stations are preferably notified of the allocation of paging resources dynamically at each paging period.

In certain embodiments, the base station 804 and mobile end system 805 may communicate in TDMA time slots using spread spectrum encoded messages, wherein data symbols are encoded using an M-ary direct sequence spread spectrum communication technique. Such techniques are described, for example, in U.S. Pat. Nos. 5,022,047, 5,016, 255 and 5,659,574, each of which is hereby incorporated by reference as if set forth fully herein. U.S. Pat. No. 5,659,574 also describes techniques for differential phase encoding and decoding of a spread spectrum signal, which may be used in conjunction with various embodiments described herein.

In one embodiment, the next slot pointer is used in a system which employs a next slot pointer for increasing the speed of control traffic transactions. In such an embodiment, the message bits in a control traffic message ordinarily reserved for identifying the next slot of a control traffic message are interpreted as identifying the time interval until the next paging packet is received. An illustrative communication system in which a next slot pointer is used to increase the speed of control traffic transactions is described in U.S. patent application Ser. No. 09/122,565 filed Jul. 24, 1998, in the name of inventors Charles Lindsay et al.

Figure 10A:
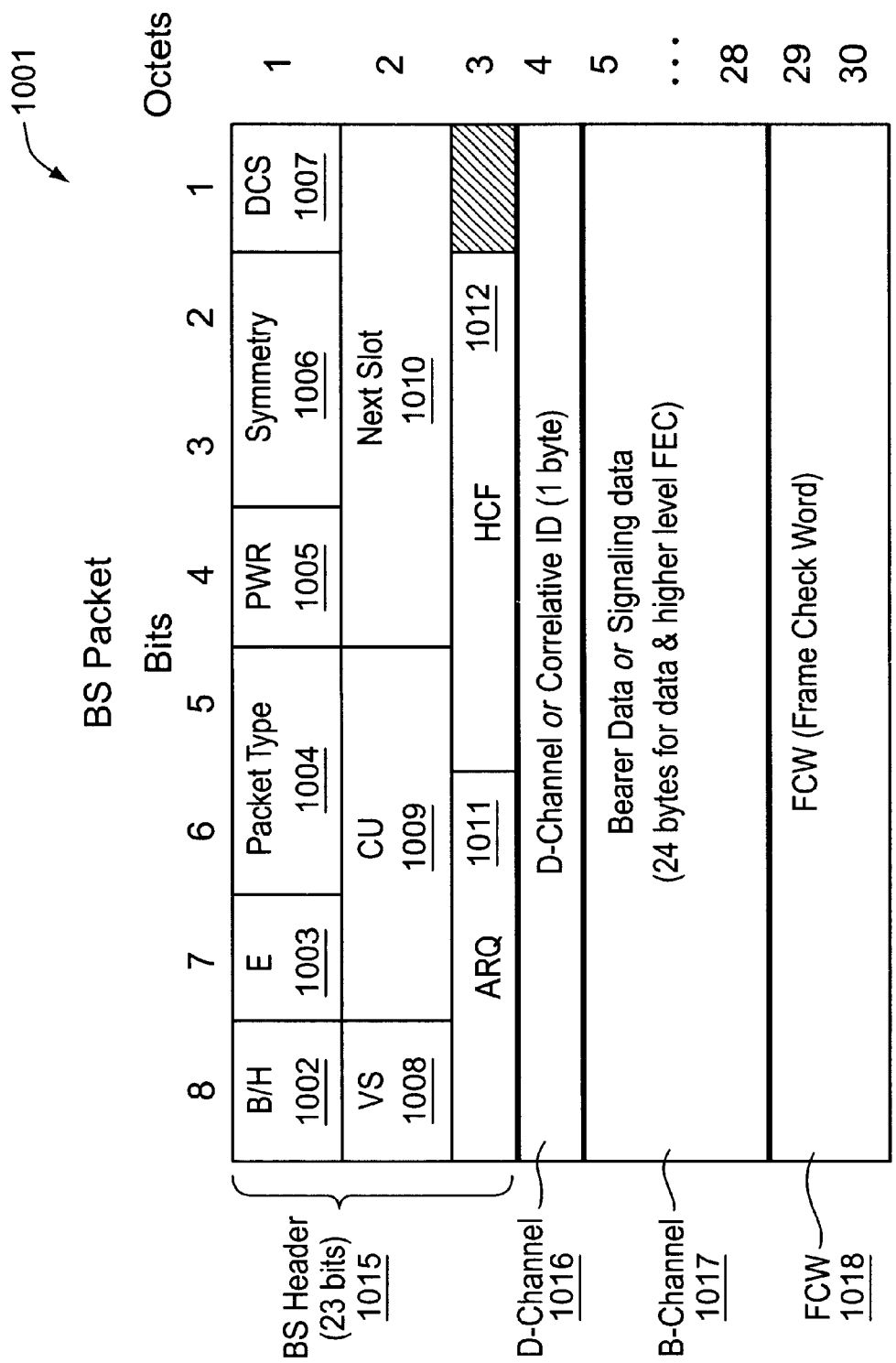
FIGS. 10A and 10B are diagrams of message formats for a base station and mobile end system, respectively, wherein a next slot pointer is used to increase the speed of control traffic transactions.
Figure 10B:
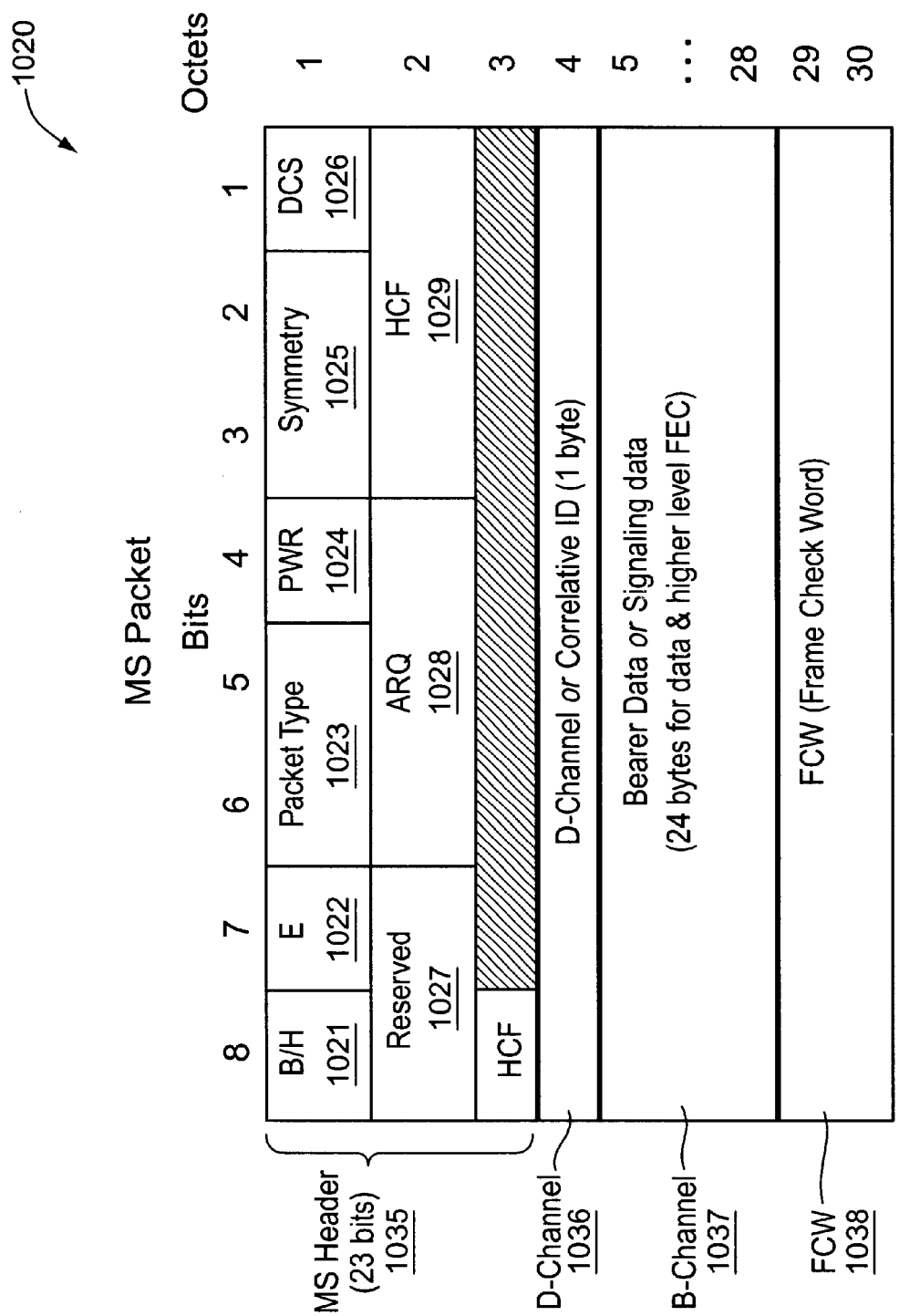

FIGS. 10A and 10B are diagrams of presently preferred message formats for a base station and mobile end system, respectively, in which a next slot pointer is utilized for increasing the speed of control traffic transactions. While examples of presently preferred message formats are shown in FIGS. 10A and 10B, any suitable message formats may be employed, the precise nature of which may depend on other features of the communication system.

FIG. 10A is a diagram of a message format for a base station message 1001 (either a signaling or bearer traffic message). The base station message 1001 comprises a base station header (BS Header) 1015, a D-channel field (or correlative ID field) 1016, a B-channel field 1017, and a frame check word (FCW) field 1018. The base station header 1015 comprises a base/mobile indicator (B/M) flag 1002, an extended protocol (E) flag 1003, a packet type field 1004, a power adjustment (PWR) field 1005, a symmetry field 1006, a D-channel suppression (DCS) flag 1007, a virtual slot (VS) flag 1008, a slot or channel utilization (CU) field 1009, a slot pointer field 1010, a error check and correct (ARQ) field 1011, and a header frame control word (HCF) field 1012. In a preferred embodiment, the B/M indicator flag 1002, E flag 1003, PWR field 1005, DCS flag 1007, and the VS flag 1008 are each 1 bit long, the packet type field 1004 and symmetry field are each 2 bits long, the CU field 1009 and ARQ field are each 3 bits long, and the slot pointer field 1010 and header HCF field 1012 are each 4 bits long, for a total of 23 bits. A twenty-fourth bit of the header 1001 is used for the purpose of assisting establishment of the RF link.

In the base station header 1015, the B/M indicator flag 1002 indicates whether the originator of the message is a mobile end system 205 (or 305 or 805, depending upon the embodiment) or the base station 204 (or 304 or 804, depending upon the embodiment). The E flag 1003 is used to indicate whether or not an extended protocol is in use. The packet type field 1004 specifies which of four packet types is being used, according to Table 10-1A below.

The packet type field 1004 also provides an indication of the usage of the D-channel/correlative ID field 1016, according to Table 10-1B below.

The PWR field 1005 is a serialized bit stream from the base station 204 to the mobile end user 205 allowing control of the power level of the mobile end system transmitter. As each base-to-mobile message is received at the mobile end user 205, the PWR bit from the last message is analyzed along with the current PWR bit to determine if the power level of the mobile end system 205 transmitter should be raised, lowered or remain unchanged. Power control action therefore requires that at least two consecutive base-to-user messages be received by the mobile end system 205 before any action is taken. The action taken is dictated according to Table 10-2 appearing below.

The amount of power increase or decrease carried out in response to receiving commands in the PWR field 1005 may be a fixed or preset amount —e.g., 1 dB for each TDMA time frame (or more frequently if the mobile end system 205 is transmitting in multiple time slots within a TDMA time frame). Using only a single bit for the PWR field 1005 saves space in the header 1015 of the base-to-mobile message 1001. The quality metrics generally provide sufficient feedback to allow small power adjustment steps over time, but not sufficient feedback to have confidence in making substantial power adjustment steps.

The symmetry field 1006 is used by the base station 204 to grant bandwidth to the mobile end user 205. The bandwidth grant generally applies to the next time slot. The symmetry field 1006 contents may be interpreted according to Table 10-3 below.

The DCS flag 1007 indicates the usage of the D-channel/correlative ID field 1016 for the current message 1001. The DCS flag 1007 is set to one value to indicate that the D-channel is disabled to reserve it for use by the application using the bearer channel (B-channel 1017), and is set to another value to indicate that the D-channel is enabled for other usage. The VS flag 1008 indicates whether the base station 204 is using a "virtual slot" mode. If the virtual slot mode is active, then all user station 102 transmissions occur one time slot earlier than if the VS mode is inactive.

The CU field 1009 indicates the relative slot utilization for the base station 204. In a referred embodiment, the CU field contents are defined according to Table 10-4 below.

The slot pointer field 1010 contains an index which identifies the next time slot to be used in the current base/user packet exchange. The mobile end user 205 transmits in the time slot indicated by the slot pointer to continue the exchange. In a particular embodiment, the contents of the slot pointer field 1010 may take on any of sixteen different values (e.g., binary 0 to 15), with each value indicating a different relative number of time slots from the present time slot in which the mobile end user 205 is to transmit. For example, a value of zero means that the mobile end user 205 is to transmit in the same slot (in the next frame if at a regular bandwidth rate, or several frames in the future if using a sub-frame rate). A value of one means that the mobile end user 205 is to transmit in the next time slot of the present time frame. A value of two means that the mobile end user 205 is to transmit in the time slot two places ahead in the present time frame, and so on.

As previously noted, the slot pointer field 1010 may serve a dual purpose. When the base station message 1001 constitutes a paging packet message, the slot pointer field 1010 may contain a next page pointer which indicates to the listening mobile end users 205 when the next paging packet message will occur, according to techniques previously described in detail herein.

The ARQ field 1011 of the base station header 1015 allows the receiving entity (either base station 204 or mobile end user 805) to correct a message error. The ARQ field 1011 comprises three subfields of one bit each; (1) an "ARQ required" sub-field that indicates whether or not ARQ is required for the message sent; (2) an "ACK" sub-field indicating whether or not the sender of the message received correctly the last message sent; and (3) a "message number" sub-field, which indicates the message number (zero or one) of the current message. The ACK sub-field and message number sub-field are always used regardless of whether the ARQ required bit is set.

If ARQ is required (as determined by the value of the ARQ required bit), then the receiving entity performs the following steps:

(1) Compares the message number sub-field of the received message with the message-number sub-field of the previously received message; if they are the same, the new message is ignored.

(2) Checks the ACK sub-field of the received message. If the value is NAK (indicating that the sender of the message did not receive the last message correctly), then the receiving entity resends the old data message; otherwise, it sends a new data message.

(3) Complements the message number sub-field bit each time a new data message is sent.

(4) If a message is received with a FCW error, or is not received at all, then the receiving entity sends its data message with the ACK sub-field set to NAK.

The header HCF field 1012 is used for a cyclic redundancy check calculated over the preceding bits of the base station message header 1015.

FIG. 10B is a diagram of a presently preferred message format for a mobile end system message 1020 (either a signaling message or bearer traffic message). The mobile end system message 1020 comprises a mobile end system header 1035, a D-channel (or correlative ID) field 1036, a bearer channel (B-channel) field 1037, and a frame check word (FCW) field 1038. The mobile end system message header 1035 comprises a base/mobile indicator (B/M) flag 1021, an extended protocol (E) flag 1022, a packet type field 1023, a PWR field 1024, a symmetry field 1025, a DCS flag 1026, a spare field 1027, an ARQ field 1028, and a header frame control word (HCF) field 1029. In a preferred embodiment, the B/M indicator flag 1021, E flag 1022, and DCS flag 1026 are each 1 bit long, the packet type field 1023, symmetry field 1025, and spare field 1027 are each 2 bits long, the ARQ field 1028 is 3 bits long, and the HCF field 1029 is 4 bits long, for a total of 17 bits.

The B/M indicator flag 1021, E flag 1022, packet type field 1023, PWR field 1024, DCS flag 1026, ARQ field 1028 and HCF field 1029 are used for the same purposes as their counterpart fields in the base station header shown in FIG. 10A. The contents of the symmetry field 1025 in the mobile end system header 1035 may be interpreted according to Table 10-5 below.

The invention has generally been described with respect to mobile end systems, as it is. viewed by the inventors as having particular advantages for a mobile system. However, the same principles described herein are applicable to a communication system in which some or all of the end systems are fixed. Therefore, the principles of the invention are not restricted only to mobile systems.

Likewise, the invention has generally been described with respect to a packet-based communication system, wherein paging messages are sent to indicate the presence of each new data packet. While the invention is seen as having particular advantages for a packet-based communication system, the principles are applicable to non-packet communication systems, or hybrid packet/non-packet communication systems, and, more generally, to any communication system in which paging traffic may vary over time.

The present invention has been set forth in the form of its preferred embodiments. It is nevertheless understood that modifications and variations of the disclosed techniques for flexible paging in a wireless communication system may be apparent to those skilled in the art without departing from the scope and spirit of the present invention. Moreover, such modifications and variations are considered to be within the purview of the appended claims.

What is claimed is:

1. A wireless communication system, comprising:
   a base station; and
   a user system capable of communicating with said base station over a wireless communication channel;
   wherein said base station is capable of:
      asynchronously transmitting paging packet messages to said user system, each paging packet message including a next page pointer indicating when a subsequent paging packet message will be transmitted;
      transmitting non-paging control traffic messages to said user systems, said non-paging control traffic messages each comprising a next slot pointer indicating when a subsequent non-paging control traffic message will be transmitted, said next slot pointer located in a same relative position within a non-paging control traffic message as said next page pointer within a paging packet message.

2. A method of communication, comprising:
   broadcasting, over a paging channel carried on a wireless connection, paging messages from a base station to a plurality of user systems by transmitting paging packet messages from said base station to said plurality of user systems, each of said paging packet messages comprising one or more of said paging messages and a next page pointer indicating when a subsequent paging packet message will be transmitted by said base station;
   dynamically adjusting an information bandwidth of said paging channel based upon a traffic level of packet data destined for said user systems;
   communicating between said base station and said user systems using a time division multiple access (TDMA) technique in which a repeating time frame is divided into a plurality of time slots, wherein said next page pointer comprises an information element indicative of a number of time frames until a subsequent paging packet message will be transmitted by said base station; and
   transmitting non-paging control traffic messages from said base station to said user systems, said non-paging control traffic messages each comprising a next slot pointer indicating when a subsequent non-paging control traffic message is to be transmitted by a recipient of said non-paging control traffic message, said next slot pointer located in a same relative position within a non-paging control traffic message as said next page pointer within a paging packet message.

3. A method of communication, comprising:
   broadcasting, over a paging channel carried on a wireless connection, paging messages from a base station to a plurality of user systems by transmitting paging messages at an increased paging rate when said relative quantity and size of said packet data messages is large, and at a decreased paging rate when said relative quantity and size of said packet data messages is small; and
   dynamically adjusting an information bandwidth of said paging channel based upon a traffic level of packet data destined for said user systems by:
      receiving, at said base station, a plurality of packet data messages destined for said user systems; and
      selecting a paging rate based upon a relative quantity and size of said packet data messages.

4. A wireless communication system, comprising:
   a base station; and
   a plurality of user systems capable of communicating with said base station over wireless data channels and receiving paging information from said base station over a paging channel;
   wherein said base station:
      dynamically adjusts a bandwidth of said paging channel based upon a traffic level of packet data destined for said user systems;
      broadcasts, over said paging channel, paging packet messages to said user systems, each paging packet message including a next page pointer indicating when a subsequent paging packet message will be transmitted by said base station and
      transmits non-paging control traffic messages to said user systems, said non-paging control traffic messages each comprising a next slot pointer indicating when a subsequent non-paging control traffic message will be transmitted, said next slot pointer located in a same relative position within a non-paging control traffic message as said next page pointer within a paging packet message.

5. A method of communication, comprising:
   broadcasting periodically, over a paging channel carried on a wireless connection, paging packet messages from a base station to a
   plurality of user systems, at least one paging packet message comprising an information element identifying when a subsequent paging packet message will be transmitted by the base station;
   increasing or decreasing a rate at which said paging packet messages are broadcast to said user systems based upon an amount of packet data to be transmitted to said user systems; and
   receiving, over a backhaul connection, packet data messages at said base station destined for said user systems, wherein said increasing or decreasing a rate at which said paging packet message are broadcast to said user systems comprises the selecting an interval between paging packet messages based at least in part upon a relative quantity and size said packet data messages.

6. The method of claim 5, further comprising the communicating between said base station and user systems according to a time division multiple access (TDMA) communication technique wherein a repeating time frame is divided into a plurality of time slots.

7. The method of claim 6, further comprising:

transmitting one or more pages with each paging packet message;

dividing each of said data packet messages into one or more frames;

for each user system responding to a page, transmitting said frames to the target user system, one frame being transmitted per time slot.

8. The method of claim 6, wherein said information element identifying when a subsequent paging packet message will be transmitted by the base station comprises a numerical value indicating a number of time frames until the subsequent paging packet message will be transmitted by the base station.

9. The method of claim 6, wherein at least one time slot is reserved for bearer traffic.

10. The method of claim 6, further comprising the step of transmitting said paging packet messages in a preset time slot.

* * * * *

UNITED STATES PATENT AND TRADEMARK OFFICE
CERTIFICATE OF CORRECTION

PATENT NO. : 6,477,382 B1
DATED : November 5, 2002
INVENTOR(S) : Mansfield et al.

It is certified that error appears in the above-identified patent and that said Letters Patent is hereby corrected as shown below:

Column 19,
Between lines 6 and 7, insert Table 10-1A:

Table 10-1A

| Packet Field | Packet Type |
|---|---|
| 00 | Normal traffic |
| 01 | Specific Poll |
| 10 | Control (signaling) traffic |
| 11 | General poll, or general response |

Between lines 9 and 10, insert Table 10-1B:

Table 10-1B

| Packet Field | D-channel/Corr. ID Field Usage |
|---|---|
| 00 | D-Channel |
| 01 | Correlative ID |
| 10 | Correlative ID |
| 11 | Reserved |

Between lines 21 and 22, insert Table 10-2:

Table 10-2

| Last Bit | CurrentBit | Action |
|---|---|---|
| 0 | 0 | Decrease transmitter power |
| 1 | 1 | Increase transmitter power |
| 0 | 1 | Leave power unchanged |
| 1 | 0 | Leave power unchanged |
| missing | any | Leave power unchanged |
| any | missing | Leave power unchanged |

Between lines 37 and 38, insert Table 10-3:

Table 10-3

| Symmetry Bits | Meaning |
|---|---|
| 00 | Symmetric bandwidth grant. Each direction has been granted one half of the bandwidth. |
| 01 | The maximum bandwidth has been granted to the user station 102, and the minimum bandwidth has been granted to the base station 104. |
| 10 | The maximum bandwidth has been granted to the base station 104, and the minimum bandwidth has been granted to the user station 102. |
| 11 | Broadcast mode. The entire bandwidth has been granted to the base station 104. There is no user station 102 packet. |

UNITED STATES PATENT AND TRADEMARK OFFICE
CERTIFICATE OF CORRECTION

PATENT NO.    : 6,477,382 B1
DATED         : November 5, 2002
INVENTOR(S)   : Mansfield et al.

It is certified that error appears in the above-identified patent and that said Letters Patent is hereby corrected as shown below:

Column 19 (cont'd),
Between lines 50 and 51, insert Table 10-4:

Table 10-4

| CU Field Contents | Utilization |
|---|---|
| 000 | No channels available: Find another base station |
| 001 | One channel available: 911 calls only |
| 010 | Two channels available: 911 calls or handover only |
| 011 | Few channels available: Class control is in effect for registrations and originations |
| 100 | Nearly full: Access Unrestricted |
| 101 | Moderately full: Access Unrestricted |
| 110 | Partially full: Access Unrestricted |
| 111 | All slots available: Access Unrestricted |

Column 20,
Between lines 63 and 64, insert Table 10-5:

Table 10-5

| Symmetry Field | Meaning |
|---|---|
| 00 | Symmetric bandwidth is requested for the next time slot |
| 01 | Maximum bandwidth is requested for the next time slot |
| 10, 11 | (Not presently used) |

Signed and Sealed this

Thirtieth Day of September, 2003

JAMES E. ROGAN
*Director of the United States Patent and Trademark Office*